US006399531B1

(12) United States Patent
Job et al.

(10) Patent No.: US 6,399,531 B1
(45) Date of Patent: *Jun. 4, 2002

(54) HYBRID ZIEGLER-NATTA AND CYCLOALKADIENYL CATALYSTS FOR THE PRODUCTION OF POLYOLEFINS

(75) Inventors: Robert Charles Job, Bound Brook; Walter Thomas Reichle, Warren, both of NJ (US)

(73) Assignee: Union Carbide Chemicals & Plastics Technology Corporation, Danbury, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/473,486

(22) Filed: Dec. 28, 1999

(51) Int. Cl.⁷ ............................ C08F 4/614; B01J 31/38
(52) U.S. Cl. .................. 502/104; 502/113; 502/117; 502/129; 502/133; 502/134; 502/152; 526/114; 526/119; 526/160; 526/943
(58) Field of Search ................................ 502/103, 104, 502/113, 117, 118, 129, 132, 133, 152; 526/114, 119, 160, 943, 351, 352

(56) References Cited

U.S. PATENT DOCUMENTS

| 4,461,873 A | | 7/1984 | Bailey et al. | |
|---|---|---|---|---|
| 4,530,914 A | | 7/1985 | Ewen et al. | |
| 4,659,685 A | | 4/1987 | Coleman, III et al. | |
| 4,808,561 A | | 2/1989 | Welborn et al. | |
| 4,816,433 A | * | 3/1989 | Terano et al. | 502/127 |
| 4,839,321 A | * | 6/1989 | Murai et al. | 502/127 |
| 4,927,797 A | * | 5/1990 | Ewen | 502/127 |
| 4,935,474 A | | 6/1990 | Ewen et al. | |
| 4,937,299 A | | 6/1990 | Ewen et al. | |
| 5,183,867 A | | 2/1993 | Welborn et al. | |
| 5,266,544 A | | 11/1993 | Tsutsui et al. | |
| 5,317,036 A | | 5/1994 | Brady, III et al. | |
| 5,387,567 A | | 2/1995 | Tajima et al. | |
| 5,395,810 A | | 3/1995 | Shamshoum et al. | |
| 5,504,048 A | * | 4/1996 | Shamshoum et al. | 502/117 |
| 5,527,752 A | | 6/1996 | Reichle et al. | |
| 5,539,076 A | | 7/1996 | Nowlin et al. | |
| 5,747,405 A | | 5/1998 | Little et al. | |
| 5,767,031 A | * | 6/1998 | Shamshoum et al. | 502/104 |
| 6,124,412 A | * | 9/2000 | Bin-Taleb et al. | 526/159 |
| 6,225,420 B1 | * | 5/2001 | Palmqvist et al. | 526/65 |

FOREIGN PATENT DOCUMENTS

| EP | 747402 | 3/1995 |
|---|---|---|
| EP | 705848 | 4/1996 |
| EP | 676418 | 12/1996 |
| EP | 717755 | 2/1999 |
| EP | 676418 | 7/2000 |
| WO | WO 9513871 | 5/1995 |
| WO | WO 9613532 | 5/1996 |
| WO | WO 9802245 | 1/1998 |

OTHER PUBLICATIONS

Scott, Alex, "Ziegler–Natta Fends off Metallocene Challenge", Chemical Week. p. 32 (May 5, 1999).

* cited by examiner

Primary Examiner—David W. Wu
Assistant Examiner—R. Harlan

(57) ABSTRACT

A solid self-supported hybrid catalyst is disclosed which contains (i) a Ziegler-Natta catalyst component including at least one group IVB metal-containing alkoxide or aryloxide; and (ii) Cp, where Cp is a cycloalkadienyl hydrocarbon having from 3–30 carbon atoms. A method of making the self-supported hybrid catalyst and a method of polymerizing olefins using the catalysts also are disclosed. The catalysts are capable of producing polyolefins in high yield having a broad molecular weight distribution, or a bimodal molecular weight distribution.

20 Claims, 3 Drawing Sheets

HYBRID ZIEGLER-NATTA AND CYCLOALKADIENYL CATALYSTS FOR THE PRODUCTION OF POLYOLEFINS

BACKGROUND OF THE INVENTION

1. Field of the Invention

The present invention relates to a hybrid catalyst system containing a mixed metal alkoxide Ziegler-Natta portion and a cycloalkadienyl portion, which is useful for producing polyolefins including broad molecular weight and bimodal polyolefins. The invention also relates to methods of making the hybrid catalyst, and its use in making polyolefins having a bimodal molecular weight distribution.

2. Description of Related Art

For certain applications of polyethylene, toughness, strength and environmental stress cracking resistance are important considerations. These properties are enhanced when the polyethylene is of high molecular weight. However, as the molecular weight of the polymer increases, the processability of the resin usually decreases. By providing a polymer with a broad or bimodal molecular weight distribution, the properties characteristic of high molecular weight resins are retained and processability, particularly extrudability, is improved.

Bimodal molecular weight distribution of a polyolefin indicates that the polyolefin resin comprises two components of different average molecular weight, and implicitly requires a relatively higher molecular weight component and low molecular weight component. A number of approaches have been proposed to produce polyolefin resins with broad or bimodal molecular weight distributions. One is post-reactor or melt blending, in which polyolefins of at least two different molecular weights are blended together before or during processing. U.S. Pat. No. 4,461,873 discloses a method of physically blending two different polymers to produce a bimodal polymeric blend. These physically produced blends, however, usually contain high gel levels, and consequently, they are not used in film applications and other resin applications because of deleterious product appearance due to those gels. In addition, this procedure of physically blending resins suffers from the requirement for complete homogenization and attendant high cost.

A second approach to making bimodal polymers is the use of multistage reactors. Such a process relies on a two (or more) reactor set up, whereby in one reactor, one of the two components of the bimodal blend is produced under a certain set of conditions, and then transferred to a second reactor, where a second component is produced with a different molecular weight, under a different set of conditions from those in the first reactor. These bimodal polyolefins are capable of solving the above-mentioned problem associated with gels, but there are obvious process efficiency and capital cost concerns when multiple reactors are utilized. In addition, it is difficult to avoid producing polyolefin particles that have not incorporated a low molecular weight species, particularly, when the high molecular weight component is produced in the first reactor.

A third and more desirable strategy is direct production of a polyolefin having a broad or bimodal molecular weight distribution by use of a catalyst mixture in a single reactor. In fact, Scott, Alex, "Ziegler-Natta Fends off Metallocene Challenge," Chemical Week, pg. 32 (May 5, 1999) states that one "of the holy grails [of polyolefin research] is getting bimodal performance in one reactor for PE and PP" (quoting Chem Systems consultant Roger Green). The art recently has attempted to solve the aforementioned problems by using two different catalysts in a single reactor to produce a polyolefin product having a broad molecular weight distribution, or bimodal molecular weight distribution. Such a process is reported to provide component resin portions of the molecular weight distribution system simultaneously in situ, the resin particles being mixed on the subparticle level. For example, U.S. Pat. Nos. 4,530,914 and 4,935,474 to Ewen relate to broad molecular weight distribution polyolefins prepared by polymerizing ethylene or higher alpha-olefins in the presence of a catalyst system comprising two or more metallocenes each having different propagation and termination rate constants and aluminoxane. Similarly, U.S. Pat. No. 4,937,299 to Ewen relates to the production of polyolefin reactor blends in a single polymerization process using a catalyst system comprising two or more metallocenes having different reactivity ratios for the monomers being polymerized.

It is known that metallocenes may be affixed to a support to simulate an insoluble catalyst. U.S. Pat. No. 4,808,561 discloses reacting a metallocene with an aluminoxane and forming a reaction product in the presence of a support. The support is a porous material like talc, inorganic oxides such as Group IIA, IIIA IVA OR IVB metal oxides like silica, alumina, silica-alumina, magnesia, titania, zirconia and mixtures thereof, and resinous material such as polyolefins like finely divided polyethylene. The metallocenes and aluminoxanes are deposited on the dehydrated support material.

An advantage of a homogeneous (metallocene) catalyst system is the very high activity of the catalyst and the narrow molecular weight distribution of the polymer produced with a metallocene catalyst system. The metallocene catalysts suffer from a disadvantage in that the ratio of alumoxane cocatalyst to metallocene is high. In addition, the polymers produced using metallocene catalysts often are difficult to process and lack a number of desirable physical properties due to the single homogeneous polymerization reaction site. Moreover, these catalyst are limited in that they are single site catalysts, and consequently, produce polymer having very narrow molecular weight distribution.

Heterogeneous catalyst systems also are well known, and typically are used to prepare polymers having broad molecular weight distribution. The multiple (e.g., heterogeneous) active sites generate a number of different polymer particles of varying length and molecular weight. These heterogeneous catalyst systems typically are referred to as Ziegler-Natta catalysts. The disadvantage of many Ziegler-Natta catalysts is that it is difficult to control the physical properties of the resulting polymer, and the activity typically is much lower than the activity of the metallocene catalysts. Ziegler-Natta catalyst alone are not capable of making satisfactory polyolefins having a bimodal molecular weight distribution, and metallocene catalysts containing cycloalkadienyl groups supported on silica or aluminum alone are not capable of making satisfactory polyolefins having a broad molecular weight distribution.

The art recently has recognized a method of making bimodal resin by using a mixed catalyst system containing Ziegler-Natta and metallocene catalyst components. These mixed catalyst systems typically comprise a combination of a heterogeneous Ziegler-Natta catalyst and a homogenous metallocene catalyst. These mixed systems can be used to prepare polyolefins having broad molecular weight distribution or bimodal polyolefins, and they provide a means to control the molecular weight distribution and polydispersity of the polyolefin.

W.O Pat. 9513871, and U.S. Pat. No. 5,539,076 disclose a mixed metallocene/non-metallocene catalyst system to produce a specific bimodal, high density copolymer. The catalyst system disclosed therein is supported on an inorganic support. Other documents disclosing mixed Ziegler-Natta/metallocene catalyst on a support such as silica, alumina, magnesium-chloride and the like include, W.O. Pat. 9802245, U.S. Pat. No. 5183867, E.P Pat.0676418A1, EP 717755B1, U.S. Pat. No. 5747405, E.P. Pat. 0705848A2, U.S. Pat. No. 4,659,685, U.S. Pat. No. 5,395,810, E.P. Pat. 0747402A1, U.S. Pat. No. 5,266,544, and W.O. 9613532, the disclosures of which are incorporated herein by reference in their entirety.

Supported Ziegler-Natta and metallocene systems suffer from many drawbacks, one of which is an attendant loss of activity due to the bulky support material. Delivery of liquid, unsupported catalysts to a gas phase reactor was first described in Brady et al., U.S. Pat. No. 5,317,036, the disclosure of which is incorporated herein by reference in its entirety. Brady recognized disadvantages of supported catalysts including, inter alia, the presence of ash, or residual support material in the polymer which increases the impurity level of the polymer, and a deleterious effect on catalyst activity because not all of the available surface area of the catalyst comes into contact with the reactants. Brady further described a number of advantages attributable to delivering a catalyst to the gas phase reactor in liquid form. Brady did not appreciate, however, that a self-supported mixed Ziegler-Natta/metallocene catalyst could be used to form a polyolefin in a single reactor having a broad molecular weight distribution or a bimodal molecular weight distribution.

Another problem associated with the prior art supported mixed catalysts is that the supported catalysts often had activities lower than the activity of the homogeneous catalyst alone. Finally, it is difficult to specifically tailor the properties of the resulting polyolefin using supported mixed catalyst systems.

The prior art mixed supported catalysts also produced polymer, albeit in a single reactor, that essentially contained high molecular weight granules and low molecular weight granules. The problems discussed above that are associated with blending two different polymer particles, are also present in these systems. Moreover, producing different granules of polymers in a single reactor leads to poor reactor control, poor morphology of the resulting polymers difficulties in compounding and difficulties in pelleting the resultant polymer. Finally, it is difficult to ensure adequate mixing of the two polymer components which raises a number of quality control issues.

Coordination complexes of Group IVB metals, $\pi$-bonded ligands and heteroallyl moieties are known as useful olefin polymerization catalysts, and are described in Reichle, et al., U.S. Pat. No. 5,527,752, the disclosure of which is incorporated by reference herein in its entirety. Simply mixing an organocyclic moiety such as indene with a magnesium/zirconium ethoxide, as taught in Reichle, does not produce a catalyst capable of producing polyolefins having a broad MWD. Reacting an organocyclic moiety such as indenylzirconiumtris(pivalate) with magnesium ethoxide required strenuous reaction conditions (a basic solution in hot chlorobenzene), and it did not produce a desirable catalyst, presumably because the indenyl moiety was stripped off of the zirconium. It was heretofore thought not possible to coordinate a complex such as those disclosed in Reichle with a zirconium-containing component to produce a catalyst capable of making a broad MWD polyolefin.

Tajima, et al., U.S. Pat. No. 5,387,567 discloses a method of treating a soluble zirconium complex with an organocyclic moiety (Cp) to produce a catalyst component. The disclosure of Tajima is incorporated by reference herein in its entirety. The catalyst components described in Tajima remain in solution requiring a solution-phase polymerization, and if used in a gas phase polymerization, would require a support such as silica, and the like. The disadvantages of supported catalysts are mentioned above. Disadvantages of a solution catalyst system include difficulties in maintaining the activity of the catalyst over extended periods of time, and inefficiencies in shipping and in handling which typically require manufacture of the catalyst component on-site or in-line with the polymerization process. In addition, the activity of the catalysts described in Tajima is low thereby requiring significant amounts of catalyst, and possible post polymerization removal of catalyst residue.

SUMMARY OF THE INVENTION

There exists a need to maximize the benefits of each individual catalyst system (i.e., Ziegler-Natta and metallocene) without suffering a penalty in terms of activity of the catalyst components, and without suffering from the poor reactor control and poor product quality control discussed above. There also exists a need to produce bimodal products having excellent product strength and processability. There also exists a need to develop a catalyst to produce such bimodal polyolefins without suffering from the above-noted problems. In addition, there exists a need to develop catalysts capable of making polyolefins having a broad molecular weight distribution. It also would be desirable to produce polymer granules in a single reactor whereby the granules contain a high molecular weight component and a low molecular weight component.

It is therefore a feature of the present invention to provide a catalyst system that is capable of producing a polyolefin with a broad molecular weight distribution, and to provide a catalyst system that is capable of producing a polyolefin having a bimodal molecular weight distribution in a single reactor. It is an additional feature of the invention to provide a catalyst, a method of making the catalyst, a method of making a polyolefin having a broad molecular weight distribution, and a method of making a bimodal polyolefin using the catalyst that does not suffer from the drawbacks mentioned above. It is yet another feature of the invention to provide a catalyst system that is capable of producing polyolefin granules that contain a high molecular weight component and a low molecular weight component.

In accordance with these and other features of the present invention, there is provided a solid catalyst component for the polymerization of olefin monomers comprising: (i) a Ziegler-Natta catalyst component comprising at least one group IVB metal-containing alkoxide or aryloxide; and (ii) Cp, where Cp is a cycloalkadienyl group having from 3–30 carbon atoms.

In accordance with an additional feature of the present invention, there is provided a method of making a solid catalyst component comprising reacting: (i) a Ziegler-Natta catalyst component comprising at least one group IVB metal-containing alkoxide or aryloxide; and (ii) a Cp-containing complex in a suitable solvent to produce a mixture containing solid catalyst component, and then removing the solid catalyst component from the mixture.

In accordance with yet another feature of the present invention, there is provided a method of making a polyolefin, preferably a broad molecular weight polyolefin and/or a polyolefin having a bimodal molecular weight distribution, comprising contacting, under polymerization conditions, at least one olefin monomer with a solid catalyst component comprising: (i) a Ziegler-Natta catalyst component comprising at least one group IVB metal-containing alkoxide or aryloxide; and (ii) Cp, where Cp is a cycloalkadienyl group having from 3–30 carbon atoms. These and other features of the invention readily apparent to those skilled in the art can be achieved by reference to the detailed description that follows.

DETAILED DESCRIPTION OF PREFERRED EMBODIMENTS

Figure 1:
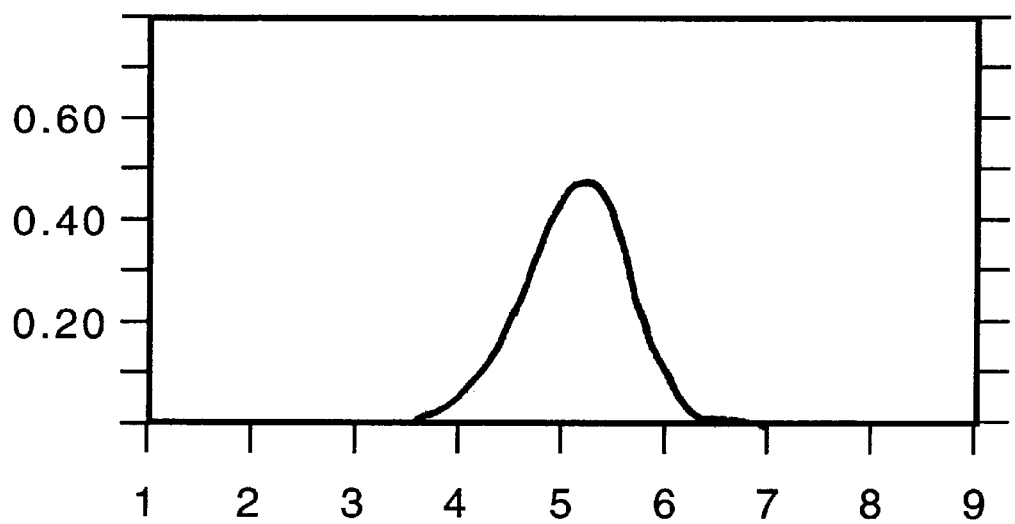
FIG. 1 is a size exclusion chromatography (SEC) representation of the molecular weight distribution of the polymer produced in accordance with example 2.

In the present invention, the hybrid catalyst component comprising the Ziegler-Natta component and the Cp component is a self-supported hybrid catalyst component, and it is denoted by the expression "self supported hybrid catalyst." The self supported hybrid catalyst does not contain conventional inorganic supports such as silica, alumina, silica-alumina, magnesium chloride, and the like. Rather, the Ziegler-Natta component of the inventive catalyst serves as a support itself, thereby rendering the catalyst "self-supported." Catalyst performance can be optimized by choice of the Cp component, its ratio to the mixed metal alkoxide complex component, the ratio of Ziegler-Natta catalyst species-containing agent (e.g., a halogenating agent, such as $TiCl_4$) to the metal in the mixed metal alkoxide, and the cocatalyst.

Throughout this description, the expression "Ziegler-Natta catalyst species" denotes any of the known metal species useful in polymerizing olefins that are present in Ziegler-Natta catalysts. For example, the species can include Ti, Hf, V, Cr, Zr, and the like. Throughout this description, the expression "Ziegler-Natta catalyst species-containing agent" denotes any agent that contains the aforementioned Ziegler-Natta catalyst species, and which can release the species upon reduction of the agent. For example, Ziegler-Natta catalyst species-containing agents can include $TiCl_4$, $VCl_4$, $HfCl_4$, $ZrCl_4$, and the like. In addition, the Ziegler-Natta catalyst species-containing agents can include mixtures of the aforementioned agents, as well as mixtures of these agents with other chlorinating agents such as $SiCl_4$, and the like.

Throughout this description, the expression "Ziegler-Natta catalyst component" denotes any Ziegler-Natta catalyst component capable of polymerizing olefins. In the invention, the Ziegler-Natta catalyst component comprises at least one group IVB metal-containing alkoxide or aryloxide, which can be incorporated into the catalyst component during its preparation, or can be incorporated into a conventional Ziegler-Natta catalyst component by chemical modification techniques known to those skilled in the art. It is preferred in the present invention that the Ziegler-Natta catalyst component be self-supported, although it may not be initially, it can be made self-supported upon modification with the at least one group IVB metal-containing alkoxide or aryloxide.

The self-supported catalyst system of the present invention is useful in the polymerization of any polyolefin, and in the polymerization of any polyolefin in which separate polymerizations with a homogeneous catalyst and with a heterogeneous catalyst are possible. Preferably, the self-supported catalyst system is useful in the polymerization of olefins, more preferably, α-olefins, and, most preferably, ethylene, propylene, butene, and hexene. The alpha olefin polymer resins may be homopolymers, copolymers, terpolymers, or admixtures of homopolymers and copolymers. Copolymers of ethylene preferably contain at least 70 weight percent ethylene and an alpha olefin of 3 to 10 carbon atoms. Preferred alpha olefins include propylene, 1-butene, 1-hexene, 1-octene and 4 methyl-pentene. Copolymers of propylene typically contain at least 65 weight percent propylene an alpha olefin of ethylene or one having 4 to 10 carbon atoms. Again, preferred alpha olefins include 1-butene, 1-hexene, 1-octene and 4 methyl-pentene.

The broad molecular weight or bimodal polyolefin resins produced using the hybrid catalyst system of the invention can have any density normally attributable to such resins. Usually, the resins have a specific density in the range of 0.86 to 0.970. The polyethylene resins (homo- or copolymers) which can be produced in accordance with the invention can exhibit densities of high density, medium density or low density resins, respectively. Accordingly, the resins can be produced which exhibit specific density in the range of 0.89 to 0.92 for low density, 0.930 to 0.940 for medium density, and 0.940 to 0.970 for high density. The polyolefin resins of the invention include, for example, ethylene homopolymers and copolymers of ethylene and one or more higher alpha-olefins such as propylene, 1-butene, 1-pentene, 1-hexene, 4-methyl-1-pentene, and 1-octene. Polyolefin resins also include, for example, ethylene/propylene rubbers (EPR's), ethylene/propylene/diene terpolymers (EPDM's) and the like.

The broad molecular weight or bimodal polyolefin resin usually has a molecular weight distribution which is characterized as the melt flow ratio (MFR) or as the weight average molecular weight divided by the number average molecular weight (Mw/Mn). The MFR of the bimodal polyolefin resins of the invention (e.g., those made using the self supporting hybrid catalyst of the invention) can range anywhere from about 35 to about 300, preferably from about 45 to about 200, and most preferably from about 70 to about 150, whereby the MFR is measured in accordance with ASTM D1238, Conditions E and F for polyethylene and Condition L for polypropylene. The MFR of the broad molecular weight polyolefin resins of the invention (e.g., those made using the self supporting cycloalkadienyl catalyst of the invention) can range anywhere from about 17 to about 40, preferably from about 25 to about 40. The Mw/Mn of resin products of the invention can range anywhere from about 4 to about 75, preferably from about 10 to about 50, and most preferably from about 15 to about 25.

The broad molecular weight or bimodal polyolefin resin prepared in accordance with the present invention usually has a flow index within the range of from about 1 to about 50, preferably from about 1.5 to about 30 and most preferably from about 2 to about 25. The broad molecular weight or bimodal polyolefin resin prepared in accordance with the present invention also typically will have a bulk density within the range of from about 15 to about 50 lbs/ft$^3$, preferably from about 20 to about 40, and most preferably from about 20 to about 30.

By using the self supported cycloalkadienyl catalyst or the self supported hybrid catalyst of the invention having at least one Cp catalyst component, and at least one Ziegler-Natta catalyst component, preferably a mixed metal alkoxide complex (i.e., heterogeneous) catalyst component, a polyolefin can be produced with a broad molecular weight distribution (MWD), as well as a polyolefin with a bimodal molecular weight distribution. The MWD can be represented by a chart of gel permeation chromatography (GPC) or determined using size exclusion chromatography (SEC). These techniques are well known in the art, and skilled artisans are capable of determining the MWD of polyolefins made in accordance with the present invention using the guidelines provided herein.

The Cp catalyst component, when used alone as a bridged component coupled together by a transition metal such as zirconium, titanium, hafnium, and the like, will usually produce a polymer with a MWD which is narrow relative to a polymer produced by a Ziegler-Natta catalyst component or a mixed metal alkoxide complex catalyst component alone. The Cp catalyst component is therefore similar in many respects to a metallocene catalyst component.

The inventors also have found that the polydispersity, i.e., the distribution of molecular weights, can be affected by using different ratios of the catalyst components. Since the molecular weight of the polymer produced with the Cp component alone (e.g., a homogeneous catalyst) is different from the molecular weight of the polymer produced using the Ziegler-Natta catalyst component (e.g., a heterogeneous catalyst), changing the relative amount of one catalyst component to the other in the self-supported hybrid catalyst system of this invention will change the polydispersity of the polymer produced. Using the guidelines provided herein including the examples, skilled artisans are capable of modifying the ratio of catalyst components to specifically tailor a polyolefin resin product.

The self-supported hybrid catalyst of the present invention preferably is useful in producing high density polyolefin products having a broad molecular weight distribution, and in producing a high molecular weight, high density bimodal polyolefin product. The catalyst usually contains a Ziegler-Natta catalyst component and a Cp catalyst component that is chemically bonded to the Ziegler-Natta catalyst component. The Ziegler-Natta catalyst component preferably comprises a mixed metal alkoxide solid complex containing at least magnesium, at least one transition metal, and alkoxide moieties, where the transition metal is at least one metal selected from the group consisting of titanium, zirconium, and hafnium, and mixtures thereof. Preferably, the mixed metal alkoxide component comprises a solid product resulting from contacting a magnesium alkoxide and a transition metal-containing (preferably, a zirconium, titanium and/or hafnium-containing) alkoxide. The Cp component preferably is any cycloalkadienyl hydrocarbon having from 3–30 carbon atoms, and more preferably is a cyclopentadienyl ligand that can be substituted and/or bridged. Combinations of different Cp components and mixed metal alkoxide components can lead to versatile catalyst compositions that can be used to produce distinct polyolefin products.

The mixed metal alkoxide component of the self-supported hybrid catalyst system is self-supported and does not require extraneous supports such as magnesium chloride, silica, alumina, and the like. Preferably, the mixed metal alkoxide component is a solid magnesium and titanium-containing component, whereby some or all of the titanium can be replaced by other transition metals such as zirconium or hafnium. Most preferably, the mixed metal alkoxide component is a solid magnesium and zirconium-containing complex.

When preparing the self-supported hybrid catalyst of the invention, the mixed metal alkoxide component preferably is reacted with a Ziegler-Natta catalyst species-containing agent to form a Ziegler-Natta component. Reaction with the Ziegler-Natta catalyst species-containing agent can be effected before, during or after reaction of the mixed metal alkoxide with the Cp-containing group. The Ziegler-Natta catalyst component typically is prepared by halogenating (with TiCl$_4$ or VCl$_4$, and/or respective mixtures thereof with SiCl$_4$) a solid precursor material that contains magnesium and zirconium to prepare a solid procatalyst. Throughout this description the term "precursor" and the expression "procatalyst precursor" denote a solid material that contains magnesium and a Group IVB metal, and which can be converted to a "procatalyst" (defined below) by contacting it with any suitable halogenating agent such as alkylaluminum halide or tetravalent titanium halide (preferably TiCl$_4$), or silicon tetrachloride (SiCl$_4$) and optionally an electron donor. Throughout this description, the term "procatalyst" denotes a solid material that is an active catalyst component, and that can be converted to a polymerization catalyst by contact with an organoaluminum compound (preferably modified methyl aluminoxane (MMAO)), and an optional external donor, or selectivity control agent.

Any unsupported magnesium and Group IVB metal-containing precursor can be used in the present invention, and any means known to halogenate such a precursor can be used to prepare a solid Ziegler-Natta catalyst component (e.g., procatalyst) when preparing the self-supported hybrid catalyst of the invention. A number of United States patents issued to Robert C. Job (and Robert C. Job, et al.,) describe various magnesium and titanium containing precursors useful for the production of procatalysts that are ultimately useful in preparing catalysts for the polymerization of a-olefins. For example, U.S. Pat. Nos. 5,034,361; 5,082,907; 5,151,399; 5,229,342; 5,106,806; 5,146,028; 5,066,737; 5,124,298, and 5,077,357, the disclosures of which are incorporated by reference herein in their entirety, disclose various procatalyst precursors. Any of the precursors described therein can be used in the present invention.

When magnesium alkoxides, such as magnesium ethoxide, are used as the starting materials to form the procatalyst precursor, a clipping agent usually is needed to break up the polymeric magnesium ethoxide and allow its reaction with the other components. As disclosed in U.S. Pat. Nos. 5,124,298 and 5,077,357, the precursor can be prepared by using chlorobenzene as a solvent and o-cresol as a clipping agent to chemically break down the polymeric magnesium ethoxide. Other clipping agents include, inter alia, 3-methoxyphenol, 4-dimethylaminophenol, 2,6-di-tert-butyl-4-methylphenol, p-chlorophenol, HCHO, $CO_2$, $B(OEt)_3$, $SO_2$, $Al(OEt)_3$, $CO_3^-$, $Br^-$, $(O_2COEt)^-$, $Si(OR)_4$, $R'Si(OR)_3$, and $P(OR)_3$. In the above compounds, R and R' represent hydrocarbon groups, preferably alkyl groups, containing from 1–10 carbon atoms, and preferably R and R' are the same or different and are methyl or ethyl. Other agents that release large anions or form large anions in situ (i.e., clipping agent precursors) can be used, such as $MgBr_2$, carbonized magnesium ethoxide (magnesium ethyl carbonate), calcium carbonate, and the like. Phenolic compounds such as p-cresol, 3-methoxyphenol, 4-dimethylaminophenol, etc., certain agents are known to dissolve magnesium alkoxides such as magnesium ethoxide, but these agents typically are employed in very large excess and usually in the presence of aliphatic, aromatic and/or halogenated hydrocarbon solvents.

Any of the solid magnesium containing procatalysts, and the methods for preparing them that are disclosed in U.S. patent application Ser. Nos. 09/345,082, 09/395,924, 09/395,916, and 09/395,917, can be used in the present invention. The disclosure of each of these applications is incorporated by reference herein in its entirety.

It is preferred that the mixed metal alkoxide component contain magnesium, Group IVB metals, and alkoxide moieties. Useful mixed metal alkoxide complexes contain, as the mixed metal portion, $Mg_x(T1T2)_y$ where T1 and T2 may be the same or different and are selected from titanium, zirconium, and hafnium, and wherein the molar ratio of x/y is from about 2.5 to about 3.75. The mixed metal alkoxide complex may have, complexed to the mixed metal portion, at least one group selected from alkoxide groups, phenoxide groups, halides, hydroxy groups, carboxyl groups and amide groups.

It is preferred in the present invention that T1 and T2 are one or more metals selected from zirconium and hafnium, and mixtures thereof. The molar ratio of the Mg metal to the T1 and T2 metals, (i.e., the ratio of x/y) preferably is within the range of from 2.5 to 3.75, more preferably within the range of from 2.7 to 3.5 and most preferably, the molar ratio is 3. It also is preferred that alkoxide groups and halide groups, (when the self-supported hybrid catalyst is prepared), are complexed to the mixed metal portion of the mixed metal alkoxide complex.

The mixed metal alkoxide complex can be made by any method capable of forming a complex between the mixture of metals, and the additional complexing groups, at least one of which is selected from alkoxide groups, phenoxide groups, halides, hydroxy groups, carboxyl groups and amide groups. Preferably, the precursor is prepared by contacting a mixture of magnesium alkoxides, halides, carboxyls, amides, phenoxides or hydroxides with a mixture of T1 and T2 metal alkoxides, halides, carboxyls, amides, phenoxides or hydroxides to form a solid precursor complex, and then separating the solid complex from the mixture. In the above-stated method of making the precursor, reaction with a halide is not considered "halogenation" as that term is used when describing the method used to prepare the self-supported hybrid catalyst of the invention. In accordance with this method, a clipping agent preferably is used and, optionally, an aliphatic alcohol can be used to form the solid precursor complex. This precursor complex then can be converted to a procatalyst component by halogenation with a Ziegler-Natta catalyst species-containing agent using any means known to those skilled in the art to prepare the self-supported hybrid catalyst of the invention.

It is most preferred that the mixed metal alkoxide complex is a controlled morphology granular solid material having the approximate formula $Mg_3M(OEt)_8Cl_2$ whereby M is a Group IV B metal. In this complex, it is preferred that the Group IV B metal be coordinated to the magnesium alkoxy moiety and thus permanently anchored thereto. Such a complex can preferably be made by the following reaction:

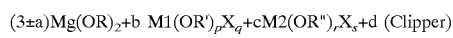

where a <1, b+c=1, d<1; p+q=4; r+s=4; M1, M2 are group IV B metals; R, R', R" are alkyl or aryl; X, Y are halide, alkoxide, alkyl, aryl; Clipper is a species which is able to assist in the breakup of the polymeric magnesium alkoxide or aryloxide, as defined above.

It is especially preferred in the present invention that the mixed metal alkoxide complex be capable of being activated using methyl aluminoxane (MAO) or MMAO as a cocatalyst. It also is preferred in the invention to use a mixed metal alkoxide complex component that produces a polymer having enhanced film and film-forming attributes. The mixed metal alkoxide complex component most preferably is prepared by contacting magnesium ethoxide, $ZrCl_4$, $Zr(OEt)_4$, and $Zr(OBu)_4$ which can be mixed with a clipping agent like methyl salicylate in the presence of a solvent. This solid precursor material then can be converted to a procatalyst by reaction with a Ziegler-Natta catalyst species-containing agent first with a mixture of silicon tetrachloride and titanium tetrachloride, and then optionally with ethylaluminum dichloride and/or boron trichloride to prepare the self-supported hybrid catalyst. Such a mixed metal alkoxide component provides an excellent support for the metallocene component (Cp).

Any cycloalkadienyl compound having from 3–30 carbon atoms can be used as the Cp component in the present invention. Preferably, Cp is an organocyclic compound having two or more conjugated double bonds, examples of which include a cyclic hydrocarbon compound having two or more, preferably 2–4, more preferably 2–3 conjugated double bonds and a total carbon number of 3–30, preferably 4–24, more preferably 4–12. The cyclic hydrocarbon compound may be partially substituted with 1–6 hydrocarbon moieties, typically alkyl or aralkyl groups of 1–12 carbon atoms.

The Cp component can be delivered to the reaction with the mixed metal alkoxide component in any form capable of delivering the Cp component and capable of allowing its reaction with the Group IV B transition metal atom in the Ziegler-Natta catalyst component. Preferably, the Cp component is delivered to the reaction via LiCp, MgCpX, where X is a halogen, HCp+aluminum alkyl, HCp+MAO or MMAO, and the like. The Cp component also may be delivered to the reaction as an organosilicon compound which may be represented by the general formula

where Cp is a cyclic hydrocarbon group such as cyclopentadienyl, substituted cyclopentadienyl, indenyl and substituted indenyl groups; R is a hydrocarbon moiety of 1–24, preferably 1–12 carbon atoms exemplified by an alkyl group such as methyl, ethyl, propyl, isopropyl, butyl, t-butyl, hexyl and octyl, an alkoxy group such as methoxy, ethoxy, propoxy and butoxy, an aryl group such as phenyl, an aryloxy group such as phenoxy, and an aralkyl group such as benzyl, or hydrogen; and L is $1 \leq L \leq 4$, preferably $1 \leq L \leq 3$.

Specifically preferred examples of Cp include, but are not limited to cyclopolyenes or substituted cyclopolyenes having 3–30 carbon atoms such as cyclopentadiene, methyl cyclopentadiene, ethyl cyclopentadiene, t-butyl cyclopentadiene, hexyl cyclopentadiene, octyl cyclopentadiene, 1,2-dimethyl cyclopentadiene, 1,3-dimethyl cyclopentadiene, 1,2,4-trimethyl cyclopentadiene, 1,2,3,4-tetramethyl cyclopentadiene, pentamethyl cyclopentadiene, indene, 4-methyl-1-indene, butylcyclopentadiene, 1,2-bis(indenyl)ethane, 4,7-dimethylindene, 4,5,6,7-tetrahydroindene, cycloheptatriene, methylcycloheptatriene, cyclooctatetraene, methylcyclooctatetraene, azurene, ethylazurene, fluorene, methylfluorene; monocyclopentadienylsilane, dicyclopentadienylsilane, tricyclopentadienylsilane, tetracyclopentadienylsilane, monocyclopentadienyl monomethylsilane, monocyclopentadienyl monoethylsilane, monocyclopentadienyl dimethylsilane, monocyclopentadienyl diethylsilane, monocyclopentadienyl trimethylsilane, monocyclopentadienyl triethylsilane, monocyclopentadienyl monomethoxysilane, monocyclopentadienyl monoethoxysilane, monocyclopentadienyl monophenoxysilane, dicyclopentadienyl monomethylsilane, dicyclopentadienyl monoethylsilane, dicyclopentadienyl dimethylsilane, dicyclopentadienyl methylethylsilane, dicyclopentadienyl dipropylsilane, dicyclopentadienyl ethylpropylsilane, dicyclopentadienyl diphenylsilane, dicyclopentadienyl phenylmethylsilane, dicyclopentadienyl monomethoxysilane, dicyclopentadienyl monoethoxysilane, tricyclopentadienyl monomethylsilane, tricyclopentadienyl monoethylsilane, tricyclopentadienyl monomethoxysilane, tricyclopentadienyl monoethoxysilane, 3-methyl cyclopentadienylsilane, bis-3-methyl cyclopentadienylsilane, 3-methyl cyclopentadienylmethylsilane, 1,2-dimethyl cyclopentadienylsilane, 1,3-dimethyl cyclopentadienylsilane, 1,2,4-trimethyl cyclopentadienylsilane, 1,2,3,4-tetramethyl cyclopentadienylsilane, pentamethyl cyclopentadienylsilane, monoindenyl silane, diindenyl silane, triindenyl silane, tetraindenyl silane, monoindenyl monomethylsilane, monoindenyl monoethylsilane, monoindenyl dimethylsilane, monoindenyl diethylsilane, monoindenyl trimethylsilane, monoindenyl triethylsilane, monoindenyl monomethoxysilane, monoindenyl monoethoxysilane, monoindenyl monophenoxysilane, diindenyl monomethylsilane, diindenyl monoethylsilane, diindenyl dimethylsilane, diindenyl diethylsilane, diindenyl methylethylsilane, diindenyl dipropylsilane, diindenyl ethylpropylsilane, diindenyl diphenylsilane, diindenyl phenylmethylsilane, diindenyl monomethoxysilane, diindenyl monoethoxysilane, triindenyl monomethylsilane, triindenyl monoethylsilane, triindenyl monomethoxysilane, triindenyl monoethoxysilane, 3-methyl indenylsilane, bis-3-methyl indenylsilane, 3-methyl indenylmethylsilane, 1,2-dimethyl indenylsilane, 1,3-dimethyl indenylsilane, 1,2,4-trimethyl indenylsilane, 1,2,3,4-tetramethy indenylsilane, pentamethyl indenylsilane, and mixtures thereof. It is especially preferred that the Cp component of the invention be selected from the group consisting of indene, 1,2,3,4,5-pentamethyl cyclopentadiene, trimethylsilyl cyclopentadiene, diphenylfulvene, 1,2-bisindenylethane, 2-methyl-indene, trimethyl silylindene, bis(indenyl) dimethylsilane, and mixtures thereof.

The self-supported hybrid catalyst of the invention can be prepared in any manner capable of reacting the selected Cp component to the selected Ziegler-Natta catalyst component (s). Initially, the respective Ziegler-Natta catalyst and Cp components are prepared separately using techniques known in the art, including those described above. Preferably, a mixed metal alkoxide precursor is prepared, and the Cp component is prepared separately. The components are then reacted with one another together with a Ziegler-Natta catalyst species-containing agent to prepare a self-supported hybrid catalyst. Skilled artisans are capable of making mixed metal alkoxide complexes and Cp components useful in the present invention using the guidelines provided herein.

It is preferred in the present invention to prepare the self-supported hybrid catalyst first by suspending or slurrying a mixed metal alkoxide component in a suitable solvent, such as toluene, xylene, chlorobenzene, and the like. The Cp component then can be added to the slurry, and then MAO or MMAO is added over a period of up to about 10 minutes. The slurry then is stirred for a period of time sufficient to react the respective components, preferably from about 10 hours to about 72 hours, more preferably from about 10 hours to about 35 hours, and most preferably for about 10 to about 24 hours. After the reaction has proceeded sufficiently, a mixture containing a solid self-supported cycloalkadienyl catalyst (SSCC) is formed. Before, during, or after formation of this mixture, the mixed metal alkoxide component can be reacted with a Ziegler-Natta catalyst species-containing agent to form the solid self-supported hybrid catalyst of the invention.

The solid component can then be removed from the mixture using techniques known in the art including filtration, evaporation, vacuum distillation, etc. The retrieved solid component then can be washed any number of times with a suitable solvent, and preferably is washed at least once with toluene, followed by washing at least once with hexane. The resulting washed solid catalyst component (either the SSCC or the self-supported hybrid catalyst) then can be dried using conventional techniques, such as passing an inert gas, like nitrogen, or the like over the solid to form a solid, granular powder-like catalyst component that can be used immediately, or stored under inert atmosphere, or slurried in mineral oil.

While not intending to be bound by any theory, it is believed that reacting the Cp component with the Ziegler-Natta catalyst component, (preferably, a mixed metal alkoxide component), provides a solid complex whereby the interaction between the individual components is strong enough to allow the catalyst to substantially remain intact during conventional polymerization conditions. It also is preferred that the interaction between the respective components be strong enough to allow the catalyst to substantially remain intact when the catalyst is suspended in, for example, mineral oil and the like. If this were not the case, one would expect the two components to break apart from each other and then function merely as a mixture of the two. If the respective components of the self-supported hybrid catalyst were separated from one another, one would expect the polymer to be similar to one made using a Ziegler-Natta catalyst alone, since the Cp component would have very little if any activity since it would not contain zirconium.

The present inventors have surprisingly found, however, that this does not occur, thereby leading them to conclude that the respective components remain in contact with one another during the polymerization. While not intending to be bound by any theory, the present inventors believe that reacting the Cp component with the Ziegler-Natta catalyst component provides polymer particles that have both high and low molecular weight components interdispersed with each other. In stark contrast to the present invention, conventional mixtures of Ziegler-Natta catalysts and Cp-containing metallocene catalysts produce high molecular weight polymer particles and low molecular weight polymer particles that must be subsequently compounded and mixed.

Any solvent can be used in the invention so long as it is capable of slurrying the Ziegler-Natta catalyst component (e.g., mixed metal alkoxide component) to allow a metathesis reaction with the Cp component. The solvents which can be utilized include inert solvents, preferably non-functional hydrocarbon solvents, and may include aliphatic hydrocarbons such as butane, isobutane, ethane, propane, pentane, isopentane, hexane, heptane, octane, decane, dodecane, hexadecane, octadecane, and the like; alicyclic hydrocarbons such as cyclopentane, methylcyclopentane, cyclohexane, cyclooctane, norbornane, ethylcyclohexane and the like; aromatic hydrocarbons such as benzene, toluene, ethylbenzene, propylbenzene, butylbenzene, xylene, tetrahydrofuran and the like; petroleum fractions such as gasoline, kerosene, light oils, and the like; and mineral oil. Likewise, halogenated hydrocarbons such as methylene chloride, chlorobenzene, ortho-chlorotoluene and the like may also be utilized. By "inert" is meant that the material being referred to does not interfere with the reaction between the mixed metal alkoxide component and the Cp component, and "inert" means that the material being referred to is non-deactivating in the polymerization reaction zone under the conditions of gas phase polymerization and is non-deactivating with the catalyst in or out of the reaction zone. By "non-functional", it is meant that the solvents do not contain groups such as strong polar groups which can deactivate the active catalyst metal sites.

The synthesis of the self-supported hybrid catalyst preferably can be carried out by reacting a pre-determined amount of a Ziegler-Natta catalyst component, preferably a mixed metal alkoxide, with a predetermined amount of Cp component in the presence of a minimal volume of a suitable solvent, and optionally, a predetermined amount of a Ziegler-Natta catalyst species-containing agent. Those skilled in the art, using the guidelines provided herein, can determine the amount of Cp component needed, as well as the amount of solvent required to facilitate the reaction. The ratio of Cp component to the mixed metal alkoxide component can vary within wide limits, and is determined by the desired product properties of the resins. For example, when making a bimodal polyolefin using the self-supported hybrid catalyst, if a greater amount of a low molecular weight component having a narrow MWD is desired, then more Cp component can be used. In a similar vein, when making a bimodal polyolefin using the self-supported hybrid catalyst, if a greater amount of a higher molecular weight component having a broader MWD is desired, then more of the mixed metal alkoxide component can be modified to produce more of the Ziegler-Natta portion.

When using the self-supported hybrid catalyst of the invention, the amounts of respective high and low molecular weight components can vary depending on the ratio of titanium to zirconium, the amount and type of mixed metal alkoxide precursor used, and the amount and type of Cp component used. Skilled artisans are capable of modifying the ratio of the respective Cp, mixed metal alkoxide, and Ziegler-Natta catalyst species-containing (e.g., SiCl$_4$ and/or TiCl$_4$) components to produce desired product properties, using the guidelines provided herein.

The self-supported hybrid catalyst of the invention serves as one component of a polymerization catalyst system where it is contacted with a cocatalyst and optionally, a selectivity control agent. Any cocatlyst typically used in the polymerization of olefins using metallocene catalysts can be used with the catalysts of the invention.

Aluminum-containing activating cocatalysts typically used with metallocene catalysts include the conventional aluminoxane compounds. Illustrative aluminoxane compounds include methylaluminoxane (MAO), modified methylaluminoxane (MMAO), or ethyl aluminoxane (EAO). Aluminoxanes are well known in the art and comprise oligomeric linear alkyl aluminoxanes represented by the formula:

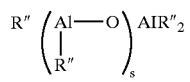

and oligomeric cyclic alkyl aluminoxanes of the formula:

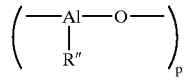

wherein s is 1–40, preferably 10–20; p is 3–40, preferably 3–20; and R" is an alkyl group containing 1 to 12 carbon atoms, preferably methyl, ethyl, or an aryl radical such as a substituted or unsubstituted phenyl or naphthyl radical.

Aluminoxanes may be prepared in a variety of ways. Generally, a mixture of linear and cyclic aluminoxanes is obtained in the preparation of aluminoxanes from, for example, trimethylaluminum and water. For example, an aluminum alkyl may be treated with water in the form of a moist solvent. Alternatively, an aluminum alkyl, such as trimethylaluminum, may be contacted with a hydrated salt, such as hydrated ferrous sulfate. The latter method comprises treating a dilute solution of trimethylaluminum in, for example, toluene with a suspension of ferrous sulfate heptahydrate. It is also possible to form methylaluminoxanes by the reaction of a tetraalkyldialuminoxane containing C$_2$ or higher alkyl groups with an amount of trimethylaluminum that is less than a stoichiometric excess. The synthesis of methylaluminoxanes may also be achieved by the reaction of a trialkyl aluminum compound or a tetraalkyldialuminoxane containing C$_2$ or higher alkyl groups with water to form a polyalkyl aluminoxane, which is then reacted with trimethylaluminum. Further modified methylaluminoxanes, which contain both methyl groups and higher alkyl groups, may be synthesized by the reaction of a polyalkyl aluminoxane containing C$_2$ or higher alkyl groups with trimethylaluminum and then with water as disclosed in, for example, U.S. Pat. No. 5,041,584.

Preferred cocatalysts are aluminoxanes, with modified methyl aluminoxane (MAO) being the most preferred.

The amount of catalyst and aluminum-containing activating cocatalyst employed in the catalyst composition can determine the split of the molecular weight distribution of the polyolefin. The term "split" denotes the relative amount of low molecular weight component to the high molecular weight component in the resulting bimodal polyolefin. By adjusting the mole ratio of total aluminum atoms contained in the aluminum-containing activating cocatalyst to the total of Group IV B metal atoms contained in the self-supported hybrid catalyst, one is able to fine tune the molecular weight distribution of the bimodal or multi-modal polyolefin. For example, it generally is known that Cp-containing metallocene catalysts require more aluminum-containing activating cocatlyst. Thus, decreasing the amount of aluminum can serve to decrease the amount of particular polymer component made by the Cp portion of the inventive self-supported hybrid catalyst, and hence, affect the MWD of the resulting polyolefin. To broaden the molecular weight distribution of the polyolefin, the aluminum/(transition metal Group IV B) mole ratio can be increased. To narrow the molecular weight distribution of the polyolefin, the aluminum/(transition metal Group IV B) mole ratio can be decreased. Using the guidelines provided herein, those skilled in the art are capable of modifying the aluminum/transition metal mole ratio to specifically tailor a polymer having a desired MWD.

Overall useful aluminum/(transition metal Group IV B) mole ratios in the SSCC and/or the self-supported hybrid catalyst composition generally range from about 2:1 to about 100,000:1, preferably from about 10:1 to about 10,000:1, and most preferably from about 50:1 to about 500:1. It is preferred in the present invention that the Al:Zr ratio be greater than about 100:1, most preferably about 300:1.

When propylene is polymerized, the catalyst system of the invention also will typically employ an external electron donor. The electron donor may be one of the electron donors which are effective with Ziegler-Natta and/or metallocene catalysts in producing polypropylene homopolymers or copolymers. Typically, the electron donor is an organosilicon compound. Examples of suitable electron donors useful in the present invention are methyl cyclohexyl dimethoxysilane (MCHDMS), diphenyldimethoxysilane (DPDMS), dicyclopentyl dimethoxysilane (DCPDMS), isobutyltrimethoxysilane (IBTMS), and n-propyl trimethoxysilane (NPTMS). Other examples of electron donors are disclosed in U.S. Pat. Nos. 4,218,339; 4,395,360; 4,328,122; 4,473, 660; 4,562,173 and 4,547,552, each of which are hereby incorporated by reference in their entirety.

The solid olefin polymerization catalyst may be used in slurry, liquid phase, gas phase and liquid monomer-type reaction systems as are known in the art for polymerizing olefins. Polymerization preferably is conducted in a fluidized bed polymerization reactor, however, by continuously contacting an alpha-olefin having 2 to 8 carbon atoms with the components of the catalyst system, i.e, the solid procatalyst component, cocatalyst and optional SCAs. In accordance with the process, discrete portions of the catalyst components can be continually fed to the reactor in catalytically effective amounts together with the alpha-olefin while the polymer product is continually removed during the continuous process. Fluidized bed reactors suitable for continuously polymerizing alpha-olefins have been previously described and are well known in the art. Fluidized bed reactors useful for this purpose are described, e.g., in U.S. Pat. Nos. 4,302,565, 4,302,566 and 4,303,771, the disclosures of which are incorporated herein by reference. Those skilled in the art are capable of carrying out a fluidized bed polymerization reaction using the guidelines provided herein.

It is preferred sometimes that such fluidized beds are operated using a recycle stream of unreacted monomer from the fluidized bed reactor. In this context, it is preferred to condense at least a portion of the recycle stream. Alternatively, condensation may be induced with a liquid solvent. This is known in the art as operating in "condensing mode." Operating a fluidized bed reactor in condensing mode generally is known in the art and described in, for example, U.S. Pat. Nos. 4,543,399 and 4,588,790, the disclosures of which are incorporated by reference herein in their entirety. The use of condensing mode has been found to lower the amount of xylene solubles in isotactic polypropylene and improve catalyst performance when using the catalyst of the present invention.

The catalyst composition may be used for the polymerization of olefins by any suspension, solution, slurry, or gas phase process, using known equipment and reaction conditions, and is not limited to any specific type of reaction system. Generally, olefin polymerization temperatures range from about 0° C. to about 200° C. at atmospheric, subatmospheric, or superatmospheric pressures. Slurry or solution polymerization processes may utilize subatmospheric or superatmospheric pressures and temperatures in the range of about 40° C. to about 110° C. A useful liquid phase polymerization reaction system is described in U.S. Pat. No. 3,324,095. Liquid phase reaction systems generally comprise a reactor vessel to which olefin monomer and catalyst composition are added, and which contains a liquid reaction medium for dissolving or suspending the polyolefin. The liquid reaction medium may consist of the bulk liquid monomer or an inert liquid hydrocarbon that is nonreactive under the polymerization conditions employed. Although such an inert liquid hydrocarbon need not function as a solvent for the catalyst composition or the polymer obtained by the process, it usually serves as solvent for the monomers employed in the polymerization. Among the inert liquid hydrocarbons suitable for this purpose are isopentane, hexane, cyclohexane, heptane, benzene, toluene, and the like. Reactive contact between the olefin monomer and the catalyst composition should be maintained by constant stirring or agitation. The reaction medium containing the olefin polymer product and unreacted olefin monomer is withdrawn from the reactor continuously. The olefin polymer product is separated, and the unreacted olefin monomer and liquid reaction medium are recycled into the reactor.

Preferably, gas phase polymerization is employed, with superatmospheric pressures in the range of 1 to 1000, preferably 50 to 400 psi, most preferably 100 to 300 psi, and temperatures in the range of 30 to 130° C., preferably 65 to 110° C. Stirred or fluidized bed gas phase reaction systems are particularly useful. Generally, a conventional gas phase, fluidized bed process is conducted by passing a stream containing one or more olefin monomers continuously through a fluidized bed reactor under reaction conditions and in the presence of catalyst composition at a velocity sufficient to maintain a bed of solid particles in a suspended condition. A stream containing unreacted monomer is withdrawn from the reactor continuously, compressed, cooled, optionally fully or partially condensed as disclosed in U.S. Pat. Nos. 4,528,790 and 5,462,999, and recycled to the reactor. Product is withdrawn from the reactor and make-up monomer is added to the recycle stream. As desired for temperature control of the system, any gas inert to the catalyst composition and reactants may also be present in the gas stream. In addition, a fluidization aid such as carbon black, silica, clay, or talc may be used, as disclosed in U.S. Pat. No. 4,994,534.

Polymerization may be carried out in a single reactor or in two or more reactors in series, and is conducted substantially in the absence of catalyst poisons. Organometallic compounds may be employed as scavenging agents for poisons to increase the catalyst activity. Examples of scavenging agents are metal alkyls, preferably aluminum alkyls, most preferably triisobutylaluminum.

The precise procedures and conditions of the polymerization are broadly conventional but the olefin polymerization process, by virtue of the use therein of the polymerization catalyst formed from the solid precursor, provides polyolefin product having a relatively high bulk density in quantities that reflect the relatively high productivity of the olefin polymerization catalyst. In addition, the polymeric products produced in the present invention have a reduced level of fines.

Conventional additives may be included in the process, provided they do not interfere with the operation of the catalyst composition in forming the desired polyolefin. When hydrogen is used as a chain transfer agent in the process, it is used in amounts varying between about 0.001 to about 10 moles of hydrogen per mole of total monomer feed. Also, as desired for temperature control of the system, any gas inert to the catalyst composition and reactants can also be present in the gas stream.

The polymerization product of the present invention can be any product, homopolymer, copolymer, terpolymer, and the like. Usually, the polymerization product is a homopolymer such as polyethylene or polypropylene, particularly polypropylene. Alternatively, the catalyst and process of the invention are useful in the production of copolymers including copolymers of ethylene and propylene such as EPR and polypropylene impact copolymers when two or more olefin monomers are supplied to the polymerization process. Those skilled in the art are capable of carrying out suitable polymerization of homopolymers, copolymers, terpolymers, etc., using liquid, slurry or gas phase reaction conditions, using the guidelines provided herein.

The invention now will be explained by reference to the non-limiting examples noted below.

EXAMPLES

The following defined terms will be used in the examples.

Glossary

Density in g/ml was determined in accordance with ASTM 1505, based on ASTM D-1928, procedure C, plaque preparation. A plaque was made and conditioned for one hour at 100° C. to approach equilibrium crystallinity, measurement for density was then made in a density gradient column.

MMAO is a solution of modified methyl aluminoxane (type 3A) in heptane, approximately 2.3 molar in aluminum, available from Akzo Corporation.

PDI stands for Polydispersity Index, which is equivalent to Molecular Weight Distribution ($M_w/M_n$). PDI was determined by size exclusion chromatography (SEC) using crosslinked polystyrene columns; pore size sequence: 1 column less than 1000 Å, 3 columns of mixed $5 \times 10^7$ Å; 1,2,4-trichlorobenzene solvent at 140° C. with refractive index detection.

MI is the melt index (optionally termed $I_2$), reported as grams per 10 minutes, determined in accordance with ASTM D-1238, condition E, at 190° C.

FI is the flow index (optionally termed $I_{21}$), reported as grams per 10 minutes, determined in accordance with ASTM D-1238 condition F, and was measured at ten times the weight used in the melt index test.

A third index, termed $I_5$, was measured under the same conditions as the MI and FI, except that 5.0 Kg weight was used.

MFR is the melt flow ratio, which is the ratio of flow index to melt index. It is related to the molecular weight distribution of the polymer.

Activity is given in Kg polymer/g catalyst/hour/100 psi ethylene.

Example 1

Preparation of the Self Supported Cycloalkadienyl Hf/Zr Catalyst

A mixed magnesium-hafnium-zirconium alkoxide complex was prepared as follows.

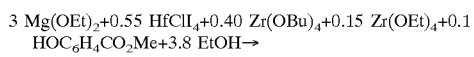

HfCl$_4$ (4.40 g, 13.75 mmol), Zr(OEt)$_4$ (1.02g, 3.75 mmol) and Zr(OBu)$_4$ (4.40 g, 87.5%, 10.0 mmol) were mixed with ethanol (5.6 ml, 4.4 g, 95 mmol) in an 8 ounce bottle, and then methyl salicylate (0.38 g, 2.5 mmol) was added and the mixture allowed to stir overnight at room temperature to obtain a straw yellow solution. To the bottle was added 70 g of chlorobenzene followed by Mg(OEt)$_2$ (8.58 g, 75 mmol) followed by another 30 g of chlorobenzene. The bottle was placed in a 100° C. oil bath and stirred for 120 minutes at 440 rpm whereupon all of the magnesium ethoxide granules appeared to have dissolved. The bottle cap was removed and a gentle flow of nitrogen passed over the reaction until about 8% of the solvent had evaporated. The mixture was transferred to a glovebox and filtered warm. The solids were washed once with chlorobenzene and twice with hexane, and then dried under moving nitrogen. Obtained were 11.2 g of white powder composed predominately of white granules between 5 to 15 microns in diameter.

To 1.12 g of the above-prepared mixed magnesium-hafnium-zirconium alkoxide complex (~1.3 mmol of Zr +Hf) slurried in 15 ml of toluene were added 0.58 g of indene (5 mmol). Over the course of 2 minutes were added 2.9 ml of MMAO/heptane solution (5 mmol Al). The pale yellow slurry was filtered after stirring overnight. The solids were washed once with toluene then three times with hexane and dried under moving nitrogen to yield 1.24 g of cream colored hybrid catalyst powder. A catalyst sample was prepared for polymerization testing by mixing 200 mg of the powder into 20 ml of KAYDOL® oil.

Polymerization of the Self Supported Cycloalkadienyl Catalyst

To a one liter stainless steel reactor, containing 500 ml of hexane and 5 ml of 1-hexene, were added 12 standard cubic centimeters (SCC) of H$_2$ (1.0 psi partial pressure). The mixed Hf/Zr catalyst sample prepared above (0.6 ml of 1.2% slurry) and MMAO (1.74 mmol of 1.74 M heptane solution) were mixed in a 50 cc bomb and then injected into the reactor (after standing 90 minutes) using ethylene pressure and about 20 ml of hexane. After polymerizing for 60 minutes at 85°, while adding ethylene on demand to keep the total pressure at 181 psi, the reaction was extinguished by injecting 2 ml of isopropanol. Catalyst decay rate had been 23%/20 minutes. The collected polymer was allowed to air dry overnight before characterization. Obtained were 77.3 g of polymer with $I_5$ of 0.47 dg/min and flow index ($I_{21}$) of 3.66 dg/min. SEC revealed a symmetrical curve with Mw/Mn=4.5.

Example 2

A magnesium zirconium alkoxide complex was prepared as follows:

Preparation of Mg and Zr-containing Precursor

A magnesium and zirconium-containing precursor was prepared via the following reaction:

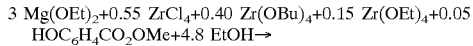

A. About 32.0 grams of ZrCl$_4$ (138 mmol), Zr(OEt)$_4$ (10.2 g, 37.5 mmol) and Zr(OBu)$_4$ (44.0 g, 87.5%, 100 mmol) were mixed with 71 ml of Ethanol (55.5 g, 1.2 mol) in a quart bottle. Methyl salicylate (1.9 g, 12.5 mmol) then was added and the mixture stirred overnight at room temperature (solution gets warm) to obtain a yellow to dark-brown solution (solids were totally dissolved). The solution was diluted with 660 g of chlorobenzene. The bottle was given a quick purge of nitrogen, capped tightly and placed in a silicone fluid (PDMS, 20cs) bath which was heating to 75° and stirred at 440rpm. When the material temperature reached 65° C., Mg(OEt)$_2$ (85.8 g, 750 mmol) was added. After 3 hours at 75° all of the magnesium ethoxide granules appeared to have dissolved to produce a homogeneous translucent slurry. A gentle nitrogen flow was started and continued for about 4 hours (until 10–15% of the solvent has evaporated). Heating was then terminated and the reaction mixture was allowed to stir and cool overnight.

The mixture was transferred to a glovebox and filtered using a 600 ml medium frit and a 1 liter vacuum flask. The bottle was rinsed with 200 ml of chlorobenzene which was then used to wash the solids. The solids were then washed 3 times with 250 ml of hexane and sucked dry to produce 88.4 g of dense white powder composed of 12–24 μm translucent granules. SEM analysis revealed the granules to be composed of short, wide platelets. Analysis of the solid material revealed that it contained about 13.9% Zr, and 13.5% Mg.

The reaction was repeated in a 5 gallon vessel utilizing about 650 g of ZrCl$_4$ (and with all other reagents scaled accordingly) to produce about 2 Kg of white granular powder.

Preparation of the Self Supported Cycloalhadienyl Zr Catalyst

To 33.04 g of the magnesium-zirconium alkoxide complex prepared in accordance with Example 2 above (50.3 mmol of Zr) slurried in 100 ml of toluene were added 17.7 g of 99% indene (152 mmol). Over the course of 5 minutes were added 115 ml of MMAO/heptane solution (200 mmol Al). The rust brown slurry was filtered after stirring overnight. The solids were washed twice with toluene then twice with hexane and dried under moving nitrogen to yield 40.65 g of tan colored catalyst powder. A catalyst sample was prepared for polymerization testing by mixing 200 mg of the powder into 20 ml of Kaydol oil.

Polymerization of the Self Supported Cycloalkadienyl Zr Catalyst

To a one liter stainless steel reactor, containing 500 ml of hexane and 5 ml of 1-hexene, were added 11 standard cubic centimeters (SCC) of H$_2$ (0.9 psi partial pressure), 0.1 ml of 0.865 M triisobutylaluminum/heptane and 1.0 ml of MMAO (1.74 mmol of 1.74 M heptane solution). The self supported catalyst sample prepared above (0.5 ml of 1.2% slurry) was placed in a 50 cc bomb and then injected into the reactor using ethylene pressure and about 20 ml of hexane. After polymerizing for 30 minutes at 65°, while adding ethylene on demand to keep the total pressure at 103 psi, the reaction was extinguished by injecting 2 ml of isopropanol. Catalyst decay rate had been 22%/20 minutes. The collected polymer was allowed to air dry overnight before characterization. Obtained were 42.4 g of polymer with I$_5$ of 0.79 dg/min and flow index (I$_{21}$) of 6.41 dg/min. SEC revealed a symmetrical curve with Mw/Mn=4.2. The SEC of this polymer is shown in FIG. 1.

The polymerization was repeated using a heptane slush of ethylaluminoxane (from Ethyl Corporation) to replace the methylaluminoxane (2 mmol Al). About 13 g of polymer were obtained.

This example and example 1 reveal that a self-supported cycloalkadienyl catalyst can be prepared that produces a polyolefin having a broad molecular weight distribution.

Example 3

Preparation of the Self-supported Hybrid Catalyst

About 2.298 gm of the self supported cycloalkadienyl Zr catalyst prepared in Example 2, was slurried in 10 ml of hexane. Over the course of about 2 minutes, 11 ml of a solution composed of 20% SiCl$_4$+5% TiCl$_4$+75% toluene was added. The resulting dark brown slurry was stirred at room temperature for about an two hours then the solids collected by filtration. The solids were washed three times with hexane and dried under moving nitrogen to yield 2.658 g of brown powder. About 1.355 g or the brown powder was slurried in 5 ml of hexane then 5 ml of SiCl$_4$/TiCl$_4$/toluene was added and the mixture stirred for 30 minutes and the solids collected by filtration. The solids were washed once with toluene then three times with hexane and dried under moving nitrogen. The yield of brown powder was 1.34 g. A sample was prepared for polymerization testing by mixing 100 mg of the powder into 20 ml of Kaydol oil.

Polymerization of the Hybrid Catalyst

Figure 2:
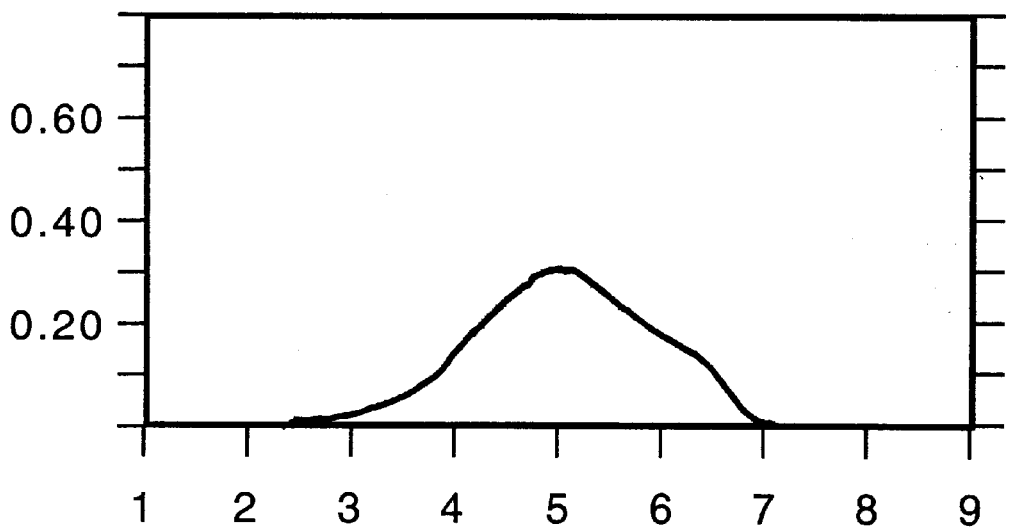
FIG. 2 is a size exclusion chromatography (SEC) representation of the molecular weight distribution of the polymer produced in accordance with example 3.

To a one liter stainless steel reactor, containing 500 ml of hexane and 5 ml hexene, were added 101 SCC of H$_2$ (1.3 psi partial pressure). First TIBA (0.1 ml of 0.865 M heptane solution) then MMAO (1.74 mmol of 1.74 M heptane solution) were injected by syringe. The hybrid catalyst sample prepared above (0.5 ml of 0.6% slurry) was injected from a 50 ml bomb using ethylene pressure and about 20 ml of hexane. After polymerizing for 30 minutes at 65°, while adding ethylene on demand to keep the total pressure at 103 psi, the reaction was extinguished by injecting 2 ml of isopropanol. The collected polymer was allowed to air dry overnight before characterization. Obtained were 54.2 g of polymer with I$_5$ of 0.32 dg/min and flow index (I$_{21}$) of 6.62 dg/min. SEC revealed a two-humped curve with Mw/Mn=18.7. The SEC is shown in FIG. 2.

Example 4

Preparation of the Self Supported Cycloalkadienyl Zr Catalyst

Into 200 ml of hexane were slurried 42.9 g the magnesium-zirconium alkoxide complex prepared in accordance with Example 2 above. With stirring, 220 ml of 20% SiCl$_4$/toluene were slowly added. The slurry was filtered after stirring for 2 hours in a 60° oil bath. The solids were washed three times with hexane and dried under moving nitrogen to obtain 39.9 g of white catalyst precursor powder.

To 3.28 g of the above described SiCl$_4$ treated magnesium-zirconium alkoxide complex (~5.0 mmol of Zr) slurried in 10 ml of toluene were added 1.16 g of indene (10 mmol). Over the course of 2 minutes were added 5.75 ml of MMAO/heptane solution (10 mmol Al). The reaction proceeded in accordance with the equation below, whereby component A is the magnesium zirconium alkoxide complex, and component B is the self supported cycloalkadienyl Zr catalyst.

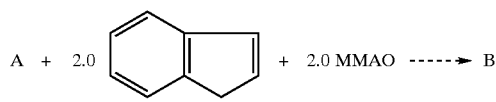

The dark brown slurry was filtered after shaking overnight. The solids were washed once with toluene then twice with hexane and dried under moving nitrogen to yield 3.27 g of khaki hybrid catalyst powder. A catalyst sample was prepared for polymerization testing by mixing 200 mg of the powder into 20 ml of Kaydol oil.

Polymerization of the Self Supported Cycloalhadienyl Zr Catalyst

To a one liter stainless steel reactor, containing 500 ml of hexane, were added 40 SCC of H$_2$ (2.2 psi partial pressure).

MMAO (1.74 mmol of 1.74 M heptane solution) was injected by syringe. The hybrid catalyst sample prepared above (1.0 ml of 1.2% slurry) was injected from a 50 ml bomb using ethylene pressure and about 20 ml of hexane. After polymerizing for 30 minutes at 85°, while adding ethylene on demand to keep the total pressure at 156 psi, the reaction was extinguished by injecting 2 ml of isopropanol. The collected polymer was allowed to air dry overnight before characterization. Obtained were 56.7 g of polymer with melt index ($I_2$) of 0.48 dg/min, $I_5$ of 1.08 dg/min and flow index ($I_{21}$) of 9.63 dg/min (MFR=20). SEC revealed a symmetrical curve with Mw/Mn=15.4.

This example reveals that broad and bimodal polyolefin can be produced by using a self-supported hybrid catalyst whereby the mixed metal alkoxide component is modified first to form a Ziegler-Natta catalyst component, and then this component is reacted with the Cp component to form the self-supported hybrid catalyst.

Example 5

Preparation of the Self Supported Cycloalkadienyl Zr Catalyst

To 33 g of the magnesium-zirconium alkoxide complex prepared in accordance with Example 2 above (50 mmol of Zr) slurried in 100 ml of toluene were added 177 g of indene (152 mmol). Over the course of 4 minutes were added 115 ml of MMAO/heptane solution (200 mmol Al). The rust brown slurry was filtered after stirring overnight. The solids were washed twice with toluene then twice with hexane and dried under moving nitrogen to yield 40.65 g of tan hybrid catalyst powder.

Preparation of Hybrid Catalysts

Figure 3:
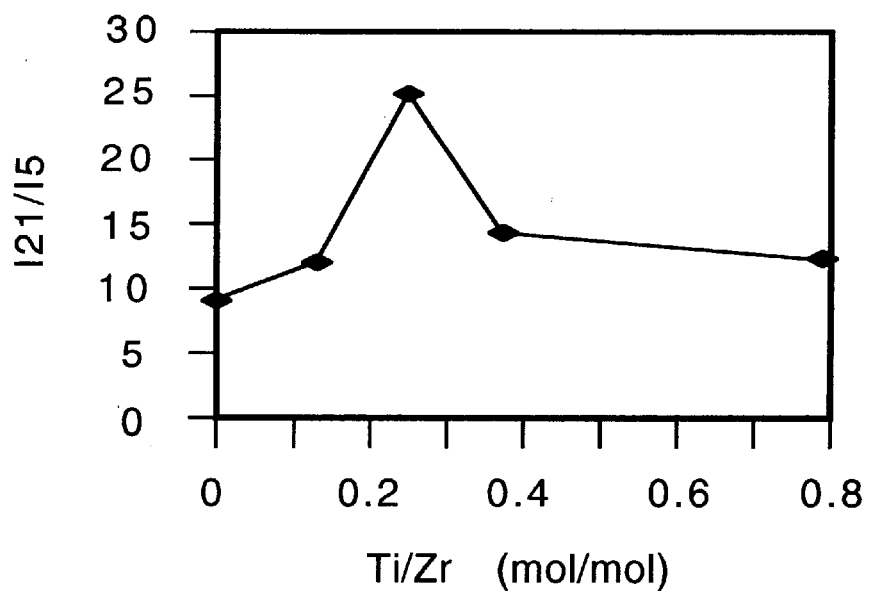
FIG. 3 is a graphical representation of the results of Example 5.

Several samples of self supported cycloalkadienyl Zr catalyst prepared as above were modified by shaking, overnight, with small amounts of $TiCl_4$ (0.1–0.8 Ti/Zr as shown in Table 1 below) in a mineral oil slurry. Polymerizations were carried out as in Example 3 except that the amount of hydrogen used in each run was varied so as to obtain polymer with flow index near 8. The goal was to add enough $TiCl_4$, as the high MW producing Ziegler-Natta catalyst species-containing agent, in order to obtain polymer with $I_{21}/I_5$ near the target of 20. The polymerization results for the different levels of $TiCl_4$ used are shown in the table below. An optimum in the $I_{21}/I_5$ value is seen at Ti/Zr~0.26, which is shown in FIG. 3

TABLE 1

| Cat # | Ti/Zr | psi $H_2$ | Kg PE/g cat /hr/100 psi | $I_{21}/I_5$ |
|---|---|---|---|---|
| 5B (150 Al) | 0 | 1.8 | 8.1 | 9 |
| 5C (150 Al) | 0.13 | 9.1 | 20.7 | soup (47 MFR) |
| 5F (150 Al) | 0.26 | 8.9 | 16.2 | >20 |
| 5D (TIBA/MMAO) | 0.39 | 31.4 | 7.4 | 6 (16 MFR) |
| 5D (75 Al) | 0.39 | 30.8 | 11.7 | 9 |
| 5D (150 Al) | 0.39 | 31.3 | 14.0 | 14 |
| 5D (300 Al) | 0.39 | 35.6 | 18.9 | 16 |
| 5E (150 Al) | 0.79 | 35.6 | 16.0 | 11 |
| 5E (300 Al) | 0.79 | 44.2 | 22.6 | 15 |

This example reveals that broad molecular weight distribution and bimodal polyolefin can be produced by using a self-supported hybrid catalyst whereby the mixed metal alkoxide component is reacted with the Cp component, and this component is modified to form the self-supported hybrid catalyst.

Example 6

Preparation of the Self Supported Cycloalkadiene Zr Catalyst

To 50.25 g of the magnesium-zirconium alkoxide complex prepared in accordance with Example 2 above (76.6 mmol of Zr) slurried in 150 ml of toluene were added 28.77 g of 99% indene (248 mmol). Over the course of 4 minutes were added 174 ml of MMAO/heptane solution (348 mmol Al). The rust brown slurry was filtered after stirring overnight. The solids were washed twice with toluene then twice with hexane and dried under moving nitrogen to yield 61.5 g of khaki colored catalyst powder.

Preparation of the Hybrid Catalyst

About 51.3 gm of the khaki colored catalyst powder was slurried in 255 ml of hexane. Over the course of about 2 minutes, 168 ml of a solution composed of 20% $SiCl_4$+5% $TiCl_4$+75% toluene was added. The resulting dark brown slurry was shaken for about an hour then the solids collected by filtration. The solids were washed once with a 50/50 mixture of hexane and toluene then three times with hexane and dried under moving nitrogen to yield 57.4 g of red-brown powder. The red-brown powder was slurried in 250 ml of hexane and treated with a second 168 ml of $SiCl_4$/$TiCl_4$/toluene as before. The yield of dried brown powder was 62.6 g. Elemental analysis revealed the powder composition to be 7.30% Zr, 6.23% Al, 7.39% Mg and 5.28% Ti. A sample was prepared for polymerization testing by mixing 20 g of the powder into 54.2 ml of Kaydol oil.

Polymerization of the Hybrid Catalyst (in gas phase/stirred bed)

Figure 4:
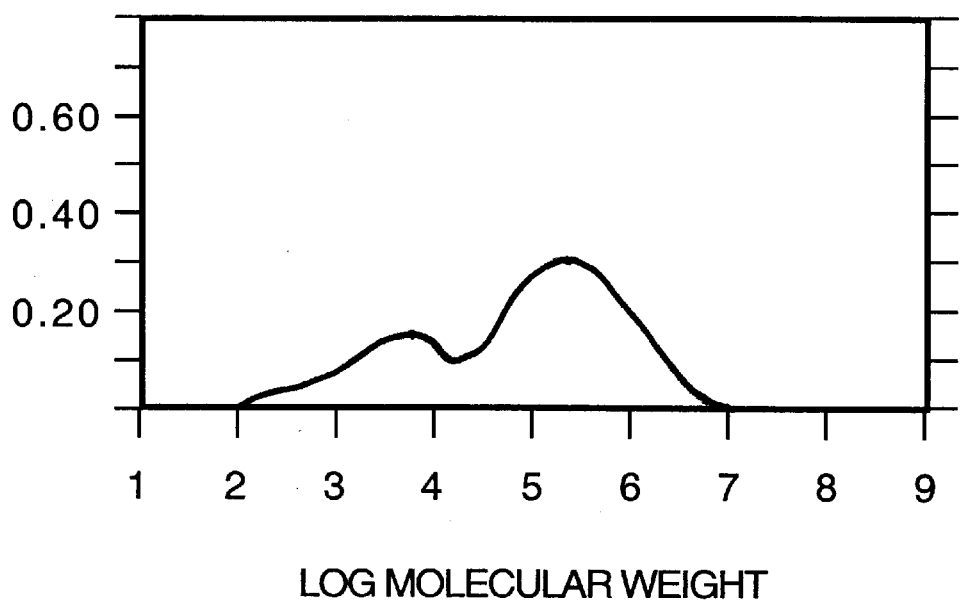
FIG. 4 is a size exclusion chromatography (SEC) representation of the molecular weight distribution of the polymer produced in accordance with example 6.

Copolymerization of ethylene and hexene was conducted in a stirred bed gas phase reactor with MMAO as the cocatalyst. Ethylene flow was adjusted to be in the range of about 5 to 7 pounds per hour. The polymer produced at a reactor pressure of 300 psig and temperature of 85 C with approximately 4500 ppm hydrogen exhibited a bimodal molecular weight distribution as demonstrated by SEC with Mw/Mn=61.7. The SEC is shown in FIG. 4.

Example 7

Preparation of the Self Supported cycloalkadiene Zr Catalyst

About 1500 g of the Mg and Zr-containing precursor of Example 2 was slurried into 3 kg of toluene in a 5 gallon reactor. While stirring at 25 to 30°, about 1260 g of 99% indene were added. To that was added about 4.7 Kg of 18.3% MMAO/isopentane (7% Al by weight). The mixture was stirred for about 12 hours at 25 to 30° then the solids collected by filtration. The solids were washed once with about 6 Kg of toluene then twice with about 6 Kg of heptane and once with isopentane then dried under moving nitrogen. Obtained were about 1750 g of light brown powder which analyzed as 10.7% Zr, 9.28% Mg, 12.8% Al and 8.77% Cl.

About 1700 g of that light brown powder was slurried into 5.3 kg of toluene in a 5 gallon reactor. While stirring at 25 to 30°, about 935 g of 99% indene were added. To that was added about 3.5 Kg of 18.3% MMAO/isopentane (7% Al by weight). The mixture was stirred for about 12 hours at 25 to 30° then the solids collected by filtration. The solids were washed twice with about 6 Kg of toluene then twice with about 6 Kg of heptane and once with isopentane then dried under moving nitrogen. Obtained were about 1870 g of brown powder which analyzed as 7.39% Zr, 7.53% Mg, 16.6% Al and 7.60% Cl.

Preparation of the Hybrid Catalyst

About 580 gm of that cycloalkadiene Zr catalyst powder was slurried into 1.3 l of hexane. Over the course of about 2 minutes, a solution composed of 118 ml $SiCl_4$+25.3 ml $TiCl_4$+640 g toluene toluene was added. The resulting dark brown slurry was shaken for about two hours with occasional venting to release some small amount of gas which formed. The solids were then collected by filtration. The solids were washed twice with a 50/50 mixture of hexane and toluene then twice with hexane and dried under moving nitrogen. That red-brown powder was slurried in 1.4 l of hexane and treated with a second solution composed of 131 ml of $SiCl_4$, 28.1 ml of $TiCl_4$ and 750 ml of toluene as before. The yield of dried brown powder was 661 g. Elemental analysis revealed the powder composition to be 6.01% Zr, 14.9% Al, 6.63% Mg and 3.79% Ti. A sample was prepared for polymerization testing by mixing 600 g of the powder into 1543 gm of Kaydol oil.

Polymerization of the Hybrid Catalyst

About 100 pounds of polyethylene having a melt index of 1.0 gram per 10 minutes and a density of 0.920 gram per cubic centimeter are charged to the reactor as a seed bed. Comonomers were ethylene and 1-hexene. The reactor was then purged with high purity nitrogen at 80 degrees C. for several hours until the moisture content was below 3 ppm. The reactor was then given 2 high pressure purges with nitrogen, and the conditions set forth in Table 2 were established in the reactor:

TABLE 2

| | |
|---|---|
| temperature (° C.) | 90 |
| pressure (psia) | 300 |
| C2 partial pressure (psi) | 80 |
| H2/C2 molar ratio | 0.02 |
| C6/C2 molar ratio | 0.005 |
| isopentane (mol %) | 12 |
| gas velocity (ft/sec) | 1.7 |

Figure 5:
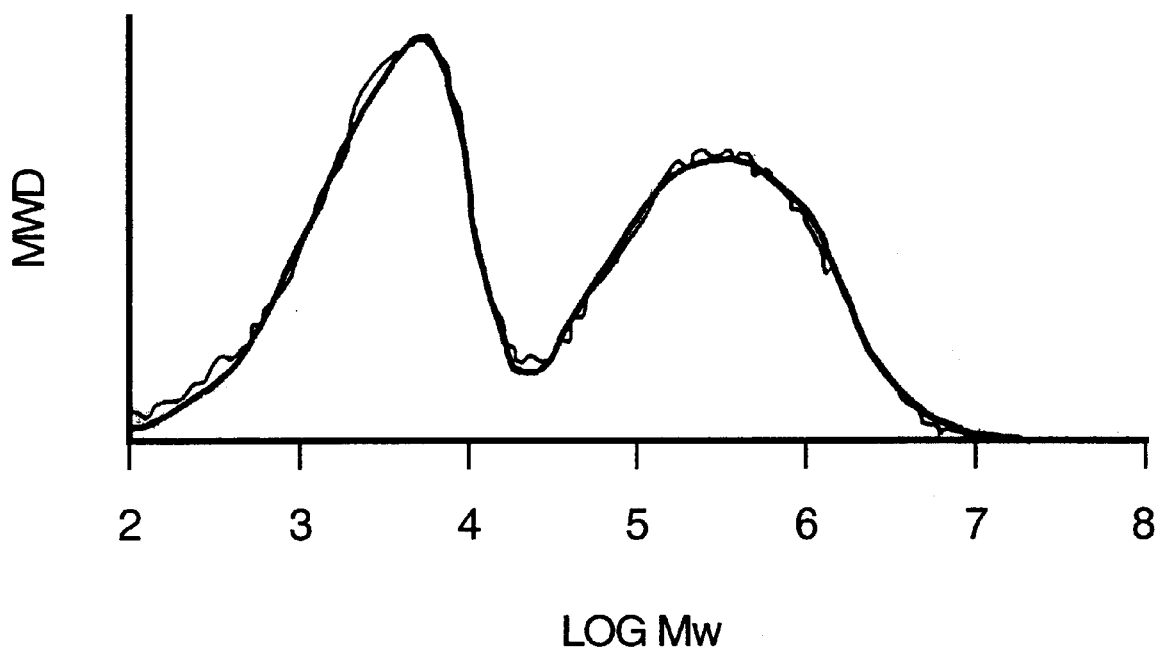
FIG. 5 is a size exclusion chromatography (SEC) representation of the molecular weight distribution of the polymer produced in accordance with example 7.

Approximately 150 cubic centimeters per hour of 4 weight percent MMAO in isopentane were fed to the reactor to serve as cocatalyst. Then, the 28% hybrid catalyst/mineral oil feed was initiated at the rate of 6 cubic centimeters per hour using a slurry catalyst feeder. The catalyst feed rate to the reactor was manipulated to result in a production rate of 30 pounds per hour of resin. In order to maintain a constant aluminum-to-titanium ratio, 25 cubic centimeters per hour of MMAO solution was fed to the reactor for each cubic centimeter per hour of catalyst fed. The $H_2/C_2$ molar ratio and $C_6/C_2$ molar ratio were manipulated in the reactor to result in a resin with a flow index of 7 to 10 decigram per minute and a density of 0.946 to 0.950 gram per cubic centimeter. The target for the split in the resin exiting the reactor was 60/40 (weight percent), i.e., 60 percent high molecular weight resin and 40 percent low molecular weight resin. This was accomplished by manipulating the Al/Ti ratio, the polymerization temperature and the ethylene partial pressure. Over the course of a six hour span, the bulk resin properties are set forth in Table 3 as follows. The SEC curve shown in FIG. 5 clearly indicates that a bimodal product was obtained.

TABLE 3

| | |
|---|---|
| flow index (g/10 min) | 7–10 |
| average flow index (g/10 min) | 24.04 |
| density (g/cc) | 0.954 to 0.956 |
| average density | 0.955 |
| melt flow ratio (I21/I2) | 300 |
| split (high Mw/Low Mw) | 51/49 |

Comparative Example

This comparative example will illustrate that supporting a pre-formed mono-Cp zirconium catalyst upon a magnesium alkoxide support severely decreases catalyst productivity. In contrast, the examples of the present invention where the Zr is incorporated into the support before the Cp group is added, exhibit far superior polymerization activity.

Preparation of Catalyst

Preparation of a controlled morphology magnesium alkoxide support.

Crystalline $[Mg_4(OMe)_6(MeOH)_{10}]Br_2$ was prepared from bromine and magnesium methoxide essentially according to the procedure of Example 67 in U.S. Pat. No. 4,806,696.

Partial Desolvation of the Magnesium Alkoxide Support.

Approximately 15 g of the crystals (~19.7 mmol Mg) prepared above were slurried in 150 ml of cyclohexane along with 2.1 g of tetraethoxysilane (10 mmol). The mixture was stirred in a 120° oil bath, under a gentle nitrogen stream, until 15% of the solvent has evaporated. The solids were collected by filtration, washed with hexane and dried under moving nitrogen to yield 13.2 g of granular powder. This corresponds to a loss of about 3 equivalents of methanol.

Impregnation of Magnesium Alkoxide Support with Single Site Catalyst.

About 4.37 g of the partially desolvated support prepared above was placed in a 60 ml, medium porosity fritted funnel. To this was added, dropwise, 1.23 g of a 58% solution of butylcyclopentadienyl zirconiumtrispivalate $\{C_4H_9C_5H_4Zr(O_2C_4H_9)_3\}$ in toluene (prepared according to procedures outlined in U.S. Pat. No. 5,527,752). The crumbly solids were agitated gently for about 5 minutes to ensure that all of the powder was wetted. A stream of dry nitrogen was then passed through the solids for about 40 minutes to obtain 4.97 g of an off-white, free flowing powder. A slurry of 165 mg of the powder in 20 ml of mineral oil was prepared as a sample for polymerization testing.

Ethylene Polymerization

Approximately 3.0 ml of the above slurry (about 5.43 micromole Zr) was utilized along with 2.0 ml of 1.73 M MMAO (3.48 mmol Al) in a slurry polymerization (as described in the inventive examples above except no hydrogen was added and only 10 ml of hexene was used) to produce 40.25 g of ethylene copolymer. The productivity was only 7.4 Kg/mmol Zr/100 psi/hour. The MFR was 17. This corresponds to a productivity of less than half that expected for the unsupported catalyst.

Example 8

Preparation of the Self Supported Cycloalkadiene Zr Catalysts

About 3.3 g of the Mg and Zr-containing magnesium-zirconium alkoxide complex prepared as in example 2 above (containing about 5 mmol of Zr) was slurried in 10 ml of toluene then treated with 11.5 ml of a heptane solution of MMAO (about 20 mmol of Al) and about 15 mmol of a cycloalkadiene chosen from the following Table. The dark colored slurry was filtered after shaking overnight. The solids were washed twice with toluene and twice with hexane then dried under moving nitrogen. Polymerization samples were prepared by mixing 200 mg of each catalyst into 20 ml of Kaydol oil.

Polymerization of the Self Supported Cycloalkadienyl Zr Catalyst

Polymerizations were carried out in a 1-liter reactor in hexane slurry, according to the procedure outlined in Example 2. The productivity (expressed as a fraction of the productivity of the SSCC catalyst of Example 2), flow index ($I_{21}$), and flow ratio ($I_{21}/I_5$) are presented in Table 4 below.

TABLE 4

| Ligand | Relative PE yield | flow index | $I_{21}/I_5$ |
|---|---|---|---|
| Indene | 1.0 | 8 | 9 |
| 1,2,3,4,5-pentamethylcyclopentadiene | 0.1 | — | — |
| trimethylsilylcyclopentadiene | 0.47 | 13 | 9 |
| diphenylfulvene | 0 | — | — |
| 1,2-bisindenylethane | 2.6 | 109 | 8 |
| 2-methyl-indene | 0.1 | — | — |
| trimethylsilylindene | 1.1 | 4 | 8 |
| bis(indenyl)dimethylsilane | 0.48 | 13 | 8 |
| indene + 2-phenylindene mixture | 0.9 | 6 | 6 |
| indene + cyclopentadiene mixture | 1.0 | 44 | 7 |

Example 9

Self supported cycloalkadienyl catalysts were prepared according to the procedure of Example 2 except that various mixed magnesium/metal alkoxide complexes shown in the Table below were used instead of the magnesium-zirconium alkoxide complex of Example 2. Polymerizations in hexane slurry were attempted as described in Example 2. The results are shown in the following table 5.

TABLE 5

| Precursor | Relative PE yield | flow index | $I_{21}/I_5$ |
|---|---|---|---|
| magnesium-hafnium-titanium-zirconium ethoxide | 0.76 | 4 | 7 |
| magnesium-hafnium ethoxide | 0 | — | — |
| magnesium-tantalum-zirconium ethoxide | 0.66 | ~9 | 10 |
| magnesiium-tin(iv)-zirconium ethoxide | 0.13 | — | — |
| magnesium-hafnium-titanium ethoxide | 0.03 | — | — |

While the invention has been described in detail with reference to particularly preferred embodiments, those skilled in the art will appreciate that various modifications can be made to the invention without significantly departing from the spirit and scope thereof. All documents described herein are incorporated by reference in their entirety.

What is claimed is:

1. A composition useful as a solid catalyst component for the polymerization of olefin monomers comprising: a mixed metal Ziegler-Natta catalyst component comprising magnesium, Group IVB metal and alkoxide or aryloxide moieties; and a cycloalkadienyl group, Cp, having from 3–30 carbon atoms, the mixed metal portion of the mixed metal Ziegler-Natta catalyst component corresponding to the formula, $Mg_x(T1T2)_y$, wherein T1 and T2 independently each occurrence are Ti, Zr, or Hf, and the molar ratio, x/y, is from 2.5 to 3.75.

2. A composition useful as a solid catalyst component for the polymerization of olefin monomers comprising magnesium, Group IVB metal and alkoxide or aryloxide moieties; and a cycloalkadienyl group, Cp, having from 3–30 carbon atoms, wherein the magnesium, Group IV metal, and alkoxide or aryloxide moieties form a mixed metal Ziegler-Na catalyst component capable of activation for olefin polymerization by use of a methylalumoxane or modified methylalumoxane cocatalyst, the mixed metal portion of the mixed metal Ziegler-Natta catalyst component corresponding to the formula, $Mg_x(T1T2)_y$, wherein T1 and T2 independently each occurrence are Ti, Zr, or Hf, and the molar ratio, x/y, is from 2.5 to 3.75.

3. A composition useful as a solid catalyst component for the polymerization of olefin monomers comprising magnesium, Group IVB metal and alkoxide or aryloxide moieties; and a cycloalkadienyl group Cp, having from 3–30 carbon atoms, wherein the magnesium, Group IV metal, and alkoxide or aryloxide moieties form a mixed metal Ziegler-Natta catalyst component further comprising Cp groups chemically bonded thereto, the mixed metal portion of the mixed metal Ziegler-Natta catalyst component corresponding to the formula, $Mg_x(T1T2)_y$, wherein T1 and T2 independently each occurrence are Ti, Zr, or Hf, and the molar ratio, x/y, is from 2.5 to 3.75.

4. A composition useful as a solid catalyst component for the polymerization of olefin monomers comprising: a mixed metal Ziegler-Natta catalyst component comprising magnesium, Group IVB metal and alkoxide or aryloxide moieties; and a cycloalkadienyl group, Cp, having from 3–30 carbon atoms, said compound being prepared by contacting a mixed metal Ziegler-Natta catalyst component precursor and a source of Cp selected from tie group consisting of LiCp, MgCpX, HCp and $CP_LSi_{4-L}$, wherein, X is halide, R is $C_{1-24}$ alkyl, aryl, alkoxy or aryloxy; and L is a number from 1 to 4, the mixed metal portion of the mixed metal Ziegler-Natta catalyst component corresponding to the formula, $Mg_x(T1T2)_y$, wherein T1 and T2 independently each occurrence are Ti Zr, or Hf, and the molar ratio, x/y, is from 2.5 to 3.75.

5. A composition as claimed in any one of claims 1–4, wherein the Group IV B metal moiety is a Zr moiety.

6. A composition as claimed in any one of claims 1–4, wherein Cp is indenyl, 1,2,3,4,5-pentamethylcyclopentadienyl, trimethylsilylcyclopentadienyl, 1,2-bisindenylethane, 2-methylindenyl, trimethylsilylindenyl, bis(indenyl)dimethylsilane, 2-phenylindenyl, or a mixture thereof.

7. A composition as claimed in claim 4, which is prepared by contacting the Ziegler-Natta catalyst component precursor with HCp in the presence of trialkylaluminum, methylalumoxane, or modified methylalumoxane.

8. A composition as claimed in any of claims 1–4, wherein the mixed metal Ziegler-Natta catalyst component is the reaction product of a magnesium alkoxide or aryloxide and at least one group IVB metal-containing alkoxide or aryloxide.

9. A composition as claimed in claim 8, wherein the mixed metal Ziegler-Natta catalyst component is prepared by contacting magnesium ethoxide, zirconium tetrachloride, zirconium tetraethoxide and zirconium tetrabutoxide, and optionally a clipping agent in the presence of a solvent.

10. A composition as claimed in claim 8, wherein the mixed metal Ziegler-Natta catalyst component additionally comprises phenoxide, halide, hydroxy, carboxyl, or amide groups.

11. A composition as claimed in claim 18 wherein the mixed metal Ziegler-Natta catalyst component corresponds to the formula: $Mg_3M(OEt)_2Cl_2$, wherein M is a Group IVB metal.

12. A composition as claimed in claim 8, wherein the Group IVB metal is coordinated to the magnesium alkoxide moiety.

13. A composition as claimed in any of claims 1–4 wherein the mixed metal Ziegler-Natta catalyst component is contacted with a halogenating agent and optionally an electron donor.

14. A composition as claimed in claim 13 wherein the halogenating agent is an alkylaluminum halide, a tetravalent titanium halide, or silicon tetrachloride.

15. A method of making a composition as claimed in claim 4 comprising:

contacting a mixed metal Ziegler-Natta catalyst component precursor and a source of Cp selected from the group consisting of LiCp, MgCpX, HCp and $Cp_LSiR_{4-L}$, wherein, X is halide, R is $C_{1-24}$ alkyl, aryl, alkoxy or aryloxy; and L is a number from 1 to 4.

16. The method as claimed in claim 15, wherein the mixed metal Ziegler-Natta catalyst component precursor, HCp and methylalumoxane or modified methylalumoxane are contacted.

17. The method as claimed in claim 16, wherein HCp is indene, 1,2,3,4,5-pentamethylcyclopentadiene, trimethylsilylcyclopentadiene, ethane-1,2-bisindene, 2-methylindene, trimethylsilylindene, dimethylsilylbis (indene), 2-phenylindene, or a mixture thereof.

18. The method of claim 15 wherein the mixed metal Ziegler-Natta catalyst component precursor is halogenated by contacting with a halogenating agent and optionally an internal electron donor.

19. In a method of polymerizing at least one olefin comprising contacting at least one olefin in the presence of a Ziegler-Natta catalyst precursor, an aluminum-containing cocatalyst, and optionally, a selectivity control agent, the improvement wherein the Ziegler-Natta catalyst precursor comprises a composition according to any one of claims 1–4.

20. The method as claimed in claim 19, wherein the olefin is selected from the group consisting of ethylene, propylene, butylene, and mixtures thereof.

* * * * *